(12) United States Patent
Lovelady

(10) Patent No.: US 6,548,819 B1
(45) Date of Patent: Apr. 15, 2003

(54) INFRARED ENHANCED PULSED SOLAR SIMULATOR

(75) Inventor: James N. Lovelady, Saugus, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/539,677

(22) Filed: Mar. 30, 2000

(51) Int. Cl.[7] .................................................. G01J 1/00

(52) U.S. Cl. ................................. 250/495.1; 250/504 R

(58) Field of Search ........................... 250/495.1, 504 R

(56) References Cited

U.S. PATENT DOCUMENTS

| | | |
|---|---|---|
| 3,202,811 A | 8/1965 | Hall |
| 4,641,227 A | 2/1987 | Kusuhara |
| 5,623,149 A * | 4/1997 | Kilmer ..................... 250/495.1 |
| 5,984,484 A * | 11/1999 | Kruer ............................ 362/1 |
| 6,154,034 A * | 11/2000 | Lovelady et al. ........... 324/501 |

OTHER PUBLICATIONS

Spectro Data Lapss II Large Area Pulsed Solar Simulator II.

* cited by examiner

Primary Examiner—John R. Lee
Assistant Examiner—David A Vanore
(74) Attorney, Agent, or Firm—Fitch, Even, Tabin & Flannery

(57) ABSTRACT

A pulsed solar simulator, and corresponding methods of solar simulation, consists of one or more mirrors and a flashlamp adjacent to the one or more mirrors. The flashlamp produces pulsed light beams comprising wavelengths from 400 nm to 1800 nm, wherein one or more primary pulsed light beams are directed at a target and one or more secondary pulsed light beams are directed at respective ones of the one or more mirrors and are directed toward the target as one or more reflected pulsed light beams by respective ones of the one or more mirrors. And, one or more respective spectral filters are positioned such that the one or more reflected pulsed light beams comprise light having a desired wavelength spectrum directed at the target. The one or more reflected pulsed light beams provide enhanced irradiation in the desired wavelength spectrum at the target compared to the irradiation provided by the one or more primary pulsed light beams alone.

18 Claims, 6 Drawing Sheets

INFRARED ENHANCED PULSED SOLAR SIMULATOR

BACKGROUND OF THE INVENTION

The present invention relates to solar simulators, and more particularly to pulsed solar simulators. Even more particularly, the present invention relates to improved Large Area Pulsed Solar Simulators (LAPSS) and corresponding methods of testing multi-junction photovoltaic solar panels.

Spacecraft employ solar arrays to convert solar energy to the DC current needed to provide the necessary electrical power on-board the spacecraft. Consisting of large numbers of photovoltaic generators (also referred to as photovoltaic cells) arranged in rows and columns of a matrix on panels joined together into an essentially planar array, the solar array or panel is oriented toward the sun and converts the incident sunlight into electricity. To ensure that the individual photovoltaic generators within the array are functional, it is conventional to test the array and measure the performance of the photovoltaic generators prior to deployment in spacecraft. Any defective photovoltaic generators or cells found are conveniently replaced. A solar simulator is used for this test.

A Large Area Pulsed Solar Simulator (LAPSS) is known in the art as a test system for such photovoltaic generators positioned on large photovoltaic power panels, also referred to as photovoltaic panels or solar panels, using a pulsed light source, such as a Xenon flashlamp. Pulsed light from the flashlamp is directed at and illuminates the surface of the solar panel. The flashlamp is typically located away from the solar panel to be tested by a distance great compared to the dimensions of the solar panel. This ensures that the entire surface of the solar panel is uniformly illuminated. Typically, the standard LAPSS can test a solar panel about 10 to 15 feet square located at about 40 feet from the solar panel. The standard LAPSS uses one or two Xenon flashlamps that provide about 4,000,000 watts of power in about 1–2 msec flashes of light over a spectrum of at least 400–1800 nm, e.g. typically 180 nm to 2600 nm. Advantageously, the pulses of light simulate actual sunlight so that the effective performance of the solar panel can be measured prior to being placed in orbit on a satellite, for example. Thus, solar panels containing defective junctions (i.e. photovoltaic generators or solar cells) can be advantageously replaced prior to being placed into orbit.

LAPSS offers a significant improvement over multi-lamp continuous solar simulators, also referred to as steady state solar simulators, which are prohibitively expensive. Additionally, such steady state solar simulators cause the surface of the solar panel to "heat up" due to the exposure of the solar panel to the steady state light source; and thus, extensive cooling is needed to control the temperature on the solar panel. Such steady state solar simulators are typically used to test entire spacecraft, whereas the conventional LAPSS is used to test solar panels.

However, newer types of photovoltaic panels require a light source that matches the spectrum of sunlight over a wider range of wavelengths than are obtainable with the standard LAPSS. Such newer types of photovoltaic panels include multi-junction photovoltaic panels. For example, a multi-junction photovoltaic panel may consist of three separate junctions: a top junction responsive to light having a wavelength of 400–650 nm, a middle junction responsive to light having a wavelength of 650–850 nm, and a bottom junction responsive to light having a wavelength of 850–1800 nm. In the standard LAPSS, the Xenon flashlamps match the solar spectrum quite well in the spectral region from 400 nm to 1000 nm (with the proper selection of current level); however, such flashlamps are significantly deficient in the infrared (IR) spectral region longer than 1000 nm. For example, the energy in this spectral region, from 1000 nm to 1800 nm, is about one third as much as the energy of natural sunlight at one AM0 (i.e. air mass zero, which is the solar constant at the average earth distance from the sun expressed in units of watts per square meter) in this spectral region. As such, the newer multi-junction photovoltaic panels are not able to be accurately tested for response to the long IR spectral region of 1000 nm to 1800 nm using the standard LAPSS.

It is noted that large scale multi-lamp steady state test simulators can accurately test multi-junction photovoltaic devices; however, such simulators are prohibitively expensive and require extensive temperature control of the illuminated surfaces. What is needed is a pulsed solar simulator, e.g. LAPSS, that can more accurately match and simulate sunlight at one AM0 in the spectral region of 1000 nm to 1800 nm, as well as sunlight at one AM0 in the spectral region of 400 nm to 1000 nm, which is required for the accurate testing of multi-junction photovoltaic solar panels.

The present invention advantageously addresses the above and other needs.

SUMMARY OF THE INVENTION

The present invention advantageously addresses the needs above as well as other needs by providing an improved LAPSS that can accurately match and simulate sunlight at one AM0 in the spectral region from 400 nm to 1800 nm, such that the accurate testing of solar panels using multi-junction photovoltaic cells is possible.

In one embodiment, the invention can be characterized as a pulsed solar simulator comprising one or more mirrors and a flashlamp adjacent to the one or more mirrors. The flashlamp produces pulsed light beams comprising wavelengths from 400 nm to 1800 nm, wherein one or more primary pulsed light beams are directed at a target and one or more secondary pulsed light beams are directed at respective ones of the one or more mirrors and are directed toward the target as one or more reflected pulsed light beams by respective ones of the one or more mirrors. And, one or more respective spectral filters are positioned such that the one or more reflected pulsed light beams comprise light having a desired wavelength spectrum directed at the target. The one or more reflected pulsed light beams provide enhanced irradiation in the desired wavelength spectrum at the target compared to the irradiation provided by the one or more primary pulsed light beams alone.

In another embodiment, the invention can be characterized as a pulsed solar simulator comprising one or more mirrors and a flashlamp adjacent to the one or more mirrors. The flashlamp produces pulsed light beams comprising wavelengths from 400 nm to 1800 nm, wherein one or more primary pulsed light beams are directed at substantially an entire testing surface of a target and one or more secondary pulsed light beams are directed at respective ones of one or more mirrors and are directed toward substantially the entire testing surface of the target as one or more reflected pulsed light beams by the respective ones of the one or more mirrors. The one or more reflected pulsed light beams provide enhanced irradiation at substantially the entire testing surface of the target compared to the irradiation provided by the one or more primary pulsed light beams alone.

In yet another embodiment, the present invention may be characterized as a method of solar simulation for testing photovoltaic solar cells comprising the steps of: producing one or more primary pulsed light beams having wavelengths comprising 400 nm to 1800 nm emitted toward a target and one or more secondary pulsed light beams having the wavelengths comprising 400 nm to 1800 nm emitted away from the target; directing the one or more primary pulsed light beams toward a target; directing the one or more secondary pulsed light beams toward the target; filtering the one or more secondary pulsed light beams into a desired range of wavelengths; and irradiating the target with the one or more primary pulsed light beams and the one or more secondary pulsed light beams, wherein the one or more secondary pulsed light beams provide enhanced irradiation in the desired range of wavelengths compared to the irradiation provided by the one or more primary pulsed light beams alone.

In an additional embodiment, the invention can be characterized as a method of solar simulation for testing photovoltaic solar cells comprising the steps of: producing one or more primary pulsed light beams having wavelengths comprising 400 nm to 1800 nm emitted toward a target and one or more secondary pulsed light beams having the wavelengths comprising 400 nm to 1800 nm emitted away from the target; directing the one or more primary pulsed light beams toward substantially an entire testing surface of a target; directing the one or more secondary pulsed light beams toward substantially the entire testing surface of the target; and irradiating substantially the entire surface of the target with the one or more primary pulsed light beams and the one or more secondary pulsed light beams, wherein the one or more secondary pulsed light beams provide enhanced irradiation at substantially the entire testing surface of the target compared to the irradiation provided by the one or more primary pulsed light beams alone.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
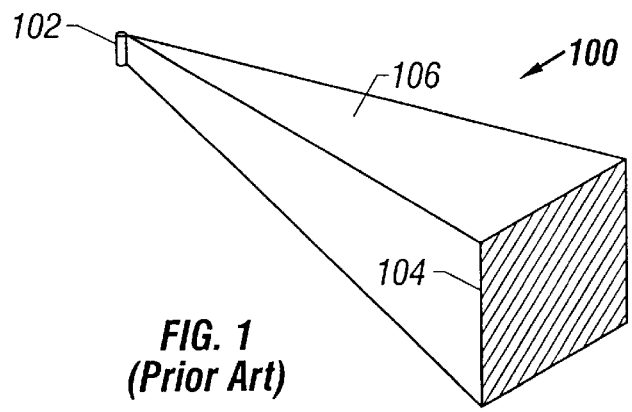
FIG. 1 is a diagram of a prior art Large Area Pulsed Solar Simulator (LAPSS)

Referring first to FIG. 1, a diagram is shown of a prior art Large Area Pulsed Solar Simulator (LAPSS). Shown is the LAPSS 100 including a flashlamp 102, target plane 104 (also referred to as a target), and the beam of light 106 emitted from the LAPSS.

In practice, a LAPSS produces a beam of light 106 (or pulsed light beam) desirably having approximately the same intensity and wavelength as sunlight at one AM0 (air mass zero). The LAPSS is used to test photovoltaic power panels, e.g. solar panels. LAPSS uses one or two flashlamps 102, such as Xenon flashlamps, that produce high intensity, short duration, pulses of light in the spectrum from 180 nm to 2600 nm, i.e. white light. Furthermore, the solar panels (for example, at the target plane 104) to be tested include photovoltaic generators or cells. These photovoltaic cells typically include a high pass spectral filter (not shown) positioned over the photovoltaic cells that block light having a wavelength of less than 400 nm, since such light less than 400 nm commonly damages the photovoltaic cells over time during testing. Thus, the beam of light 106 (i.e., the light field, which in this case is defined as the sum of light that irradiates the target plane) reaching the target plane is typically between 180 nm and 2600 nm, while the light that actually reaches and tests the photovoltaic cells of the solar panel on the target plane 104 is between 400 nm and 2600 nm, and furthermore, the spectral intensity of this light begins to decrease significantly at wavelengths longer than 1000 nm. Such Xenon flashlamps are well known high intensity gas discharge type lamps that are available in many sizes and have been used in the standard LAPSS for many years.

Typically, the flashlamp 102 is housed within a metal lamp housing (not shown) that includes an aperture (not shown) or window for the beam of light 106 emitted from the flashlamp 102 to irradiate a target plane 104, for example, the surface of the solar panel including photovoltaic cells to be tested. The lamp housing includes non-reflective interior walls such that pulsed light emitted from the back and side of the flashlamp 102 is not reflected back at the target plane 104. Such reflected light may introduce substantial non-uniformity into the total light field emitted toward the target plane 104. For example, in a non-uniform light field, the intensity of the light field may vary at differing locations on the target plane 104.

Thus, the standard LAPSS provides a uniform intensity beam of light 106 that is directed at the target plane 104, e.g. the surface of the solar panel or photovoltaic panel containing the photovoltaic cells (also known as the testing surface). Typically, a standard LAPSS produces a beam of light 106 having an acceptable uniformity within about plus or minus 2 percent. Furthermore, depending on the power level of the flashlamp 102, the uniform intensity beam of light 106 emitted by the flashlamp 102 of the LAPSS can be made to closely simulate sunlight irradiating the target plane 104.

Other components of the LAPSS 100 include a DC power supply (not shown) which provides a DC voltage across the flashlamp 102 which ionizes the gas, creating a discharge that conducts current and in turn releases energy in the form of heat and light, e.g. the beam of light 106. Fans (not shown), or other cooling devices are provided to cool the Xenon flashlamps 102 in between and during flashes. It is noted that the structure and components of the standard LAPSS system are well known in the art, for example, a standard LAPSS is commercially available from Spectrolab of California; thus, further explanation is not required.

Figure 2:
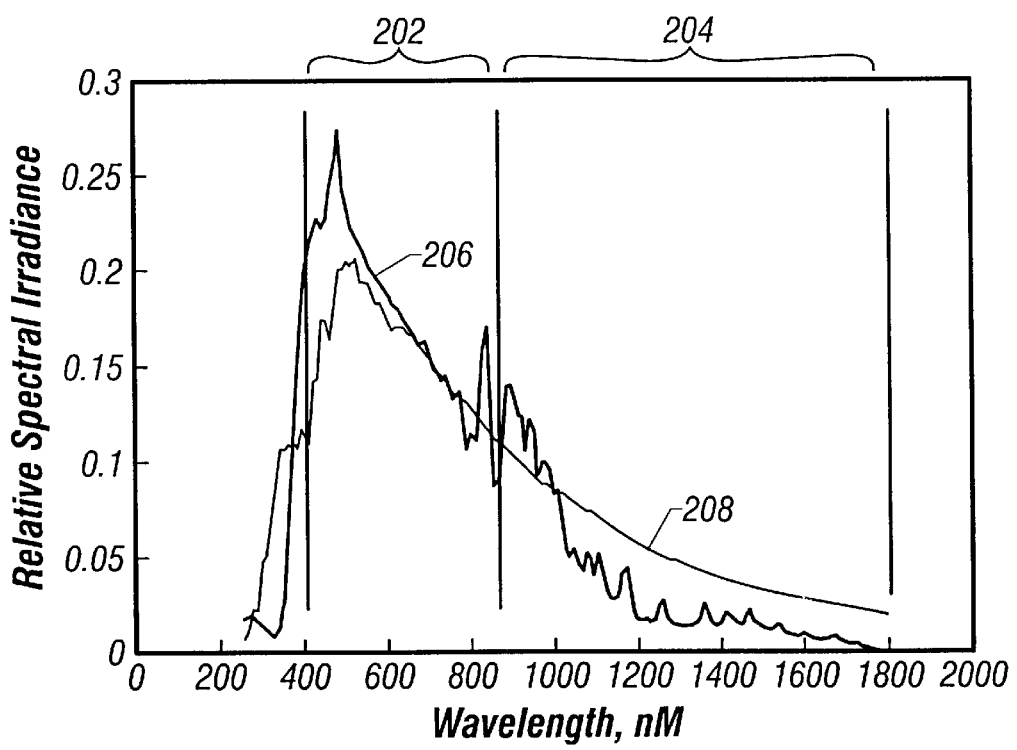
FIG. 2 is a graph of the relative spectral intensity vs. wavelength for the spectral region of a prior art Large Area Pulsed Solar Simulator of FIG. 1 compared to the relative spectral intensity vs. wavelength of sunlight at one AM0 (air mass zero)

Referring next to FIG. 2, a graph 200 is shown of the relative spectral intensity vs. wavelength for the spectral region of the prior art LAPSS of FIG. 1 compared to that of the sun at one AM0. As illustrated, the solar panels using single junction and dual-junction photovoltaic cells are responsive to light having wavelengths in the first spectral region 202, i.e. light having a wavelength between approximately 400 nm and 850 nm. As seen, within the first spectral region 202, the intensity of the standard LAPSS (shown as line 206) closely simulates the intensity of sunlight at AM0 (shown as line 208). It is known that the spectral intensity (in units of watts/cm$^2$/micron) across a given spectral region, e.g. the first spectral region 202, does not need to match the spectral intensity of sunlight across the given spectral region, e.g. the first spectral region 202, exactly; however, the total integrated energy of the light field from the LAPSS within the first spectral region 202 should approximate the total integrated energy of the sunlight with the first spectral region 202.

However, the newer multi-junction photovoltaic cells are responsive to light within the second spectral region 204, i.e. light having a wavelength between approximately 850 nm and 1800 nm, as well as light within the first spectral region 202. As seen in FIG. 2, in the second spectral region 204, the spectral intensity of the standard LAPSS (shown as line 206) is significantly less than that of sunlight (shown as line 208) in the second spectral region 204, in particular between 1000 nm and 1800 nm (also referred to as the long IR region). As such, the total integrated energy for the second spectral region 204 of the LAPSS is significantly less than the total integrated energy of sunlight at one AM0 in the second spectral region 204, i.e. about ⅓ that of sunlight at 1 AM0. And thus, the conventional LAPSS is unable to accurately test the multi-junction photovoltaic panels using multi-junction photovoltaic cells under natural conditions. Thus, it is not possible to accurately test a solar panel using multi-junction photovoltaic cells to see whether it is defective or not using a LAPSS as presently known. The present invention corrects this deficiency of light in the spectral region between 1000 nm and 1800 nm in an improved LAPSS.

Figure 3:
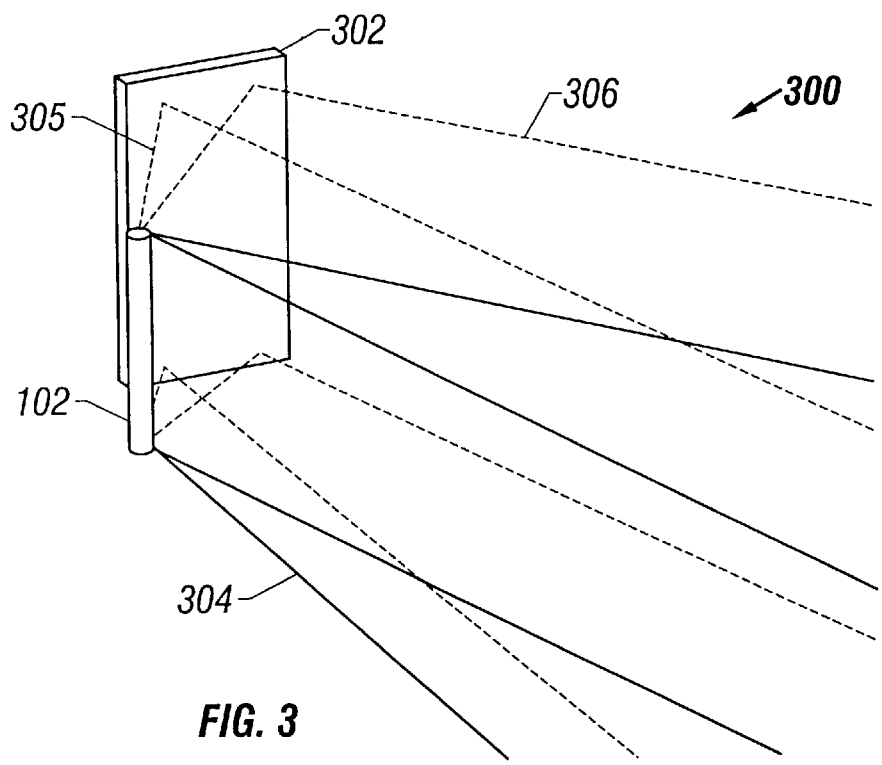
FIG. 3 is a diagram of an improved Large Area Pulsed Solar Simulator employing planar mirrors in accordance with one embodiment of the present invention.

Referring next to FIG. 3, a diagram is shown of an improved Large Area Pulsed Solar Simulator (LAPSS) employing planar mirrors in accordance with one embodiment of the present invention. Shown is the improved LAPSS 300 including a flashlamp 102, planar mirror 302 (or mirror) and emitting a primary beam of light 304 (also referred to as a primary pulsed light beam 304 or the beam of light 106), a secondary beam of light 305 (also referred to as a secondary pulsed light beam) and a reflected beam of light 306 (also referred to as a reflected pulsed light beam).

The improved LAPSS 300 is configured similarly to the prior art LAPSS 100; however, the improved LAPSS 300 includes a planar mirror positioned behind and to the side of the flashlamp 102 and within the lamp housing (not shown). Thus, the planar mirror 302 is adjacent to the flashlamp 102 or flanks the flashlamp 102. The planar mirror 302 is mounted within the lamp housing, for example, by using a support bracket, support plane or other means to physically anchor the planar mirror 302 into the lamp housing such that light emitted from the back and side of the flashlamp 102 may be directed towards the target plane (not shown), e.g. a multi-junction photovoltaic solar panel. Typically, the planar mirror 302 is held in place with support brackets within the lamp housing that connect to the top end and the bottom end of the planar mirror 302. Alternatively, this planar mirror 302 may be rotatably anchored within the lamp housing such that the planar mirror 302 may be adjusted depending on the size of the target plane and the distance to the target plane. The flashlamp 102 and the planar mirror 302 are viewable through the aperture (not shown) of the lamp housing from the target plane, i.e. where the solar panel to be tested is located.

The primary beam of light 304 may also be referred to as a first portion of the pulsed light, such that the first portion of the pulsed light is emitted toward the target plane. Note that the reflected beam of light 306 is really the secondary beam of light 305 having been reflected by the planar mirror 302. The secondary beam of light 305 may also be referred to as a second portion of the pulsed light emitted from the flashlamp 102, except that the second portion of the pulsed light is emitted away from the target plane. Thus, the reflected beam of light 306 is the same as the secondary beam of light 305 and is shown separately for illustration purposes to shown the beam before and after reflection by the planar mirror 302. As such, the reflected beam of light 306 has the same characteristics as the primary beam of light 304 emitted directly at the target plane, i.e. both the primary beam of light 304 and the reflected beam of light 306 (secondary beam of light 305) include light having wavelengths in the region of at least 400 nm to 1800 nm. Note that there is a third portion of the pulsed light that is not emitted toward or reflected toward the target plane, but which is absorbed, non-reflected, or otherwise directed away from the target plane. Again, as with the conventional LAPSS 100, this embodiment of the improved LAPSS 300 also includes high pass filters (not shown) on the solar panel (target plane) itself which filters the light entering the solar cells to wavelengths greater than 400 nm to prevent damage to the solar cells.

The improved LAPSS takes advantage of the light emitted from the back and side of the flashlamp (secondary beam of light 305), whereas in the conventional LAPSS, such light is not used (in fact, non-reflective inner surfaces, e.g. anodized metal, or baffles prevent such light from reflecting back towards the target plane in the conventional LAPSS). Again, such reflected light undesirably introduces non-uniformity into the light field that irradiates the target plane. The improved LAPSS 300 still uses non-reflective inner walls of the lamp housing with the addition of the planar mirror 302 in order to prevent the third portion of pulsed light from being directed toward the target plane. Advantageously, the secondary beam of light 305 is uniformly reflected by the planar mirror 302 back toward the target plane as the reflected beam of light 306. Since light from different sources incident upon the same location is additive, the intensity of the reflected beam of light 306 adds to the intensity of the primary beam of light 304 that is directly emitted toward the target plane. In effect, the irradiation of the target plane is increased or enhanced with the use of the planar mirror 302 across all parts of the spectrum. Thus, the intensity of the light field (i.e., the sum of light irradiating the target plane) reaching the target plane in the spectral region between 400 nm and 1800 nm is increased, which has the effect of increasing the number of flashlamps used less reflector losses.

Although the use of the planar mirror 302 provides an increased or enhanced total light field across the entire spectrum between 400 nm and 1800 nm; and thus, the spectral region between 1000 nm and 1800 nm is advantageously enhanced, this improved LAPSS does not adequately enables the testing of multi-junction photovoltaic panels that are responsive to light in the spectral region from 1000 nm to 1800 nm, as well as responsive to light in the spectral region between 400 nm and 1000 nm. While certainly, the spectral profile has been increased or enhanced in the region between 1000 nm and 1800 nm, the spectral profile has also been increased between 400 nm and 1000 nm. As such, the light field entering the multi-junction solar panel contains too much intensity in the region between 400 nm and 1000 nm, i.e. more than the Sun at 1 AM0. The solution to this problem is described with reference to FIGS. 4–9.

However, advantageously, the configuration as embodied in FIG. 3 is useful in the testing of solar panels that require higher than normal illumination, such as panels on Venus or Mercury probes using single junction (or multi-junction) solar cells. These solar panels are typically for use in spacecraft that to be located physically closer to the sun than in orbit around the Earth. For example, these spacecraft are placed in orbit around other planets closer to the Sun, such as Venus or Mercury. Thus, such single junction cells require a testing light source greater than 1 AM0 over the desired spectral region, i.e. the spectral region that the single junction cell to be used in the Mercury probe, for example, is responsive to. The use of the embodiment of FIG. 3 advantageously provides an increased illumination on such solar panels without increasing the number of flashlamps (which is costly and poses problems coordinating the flashing between multiple flashlamps) and without modifying the spectral distribution over the desired spectral region. Thus, a simple and effective testing apparatus is provided for testing single junction, or multi-junction cells, that require a higher than normal intensity of illumination or irradiance.

It is important that planar mirrors 302 are used instead of curved or parabolic mirrors, since the use of such curved mirrors introduces non-uniformity in the emitted light field (e.g. the reflected beam of light 306 has a different uniformity than the secondary beam of light 305). The light field is the sum of all light irradiating the target plane, i.e. the sum of the primary beam of light 304 and the reflected beam of light 306 (secondary beam of light 305 reflected). For example, in a non-uniform light field, the intensity of the light field emitted will vary at differing points on the target plane. As is known in the art of solar simulators, the light field emitted should be as uniform as possible, i.e. within ±2%. Thus, although the use of curved mirrors may enhance the overall intensity of light across the spectrum, the curved mirror would undesirably introduce non-uniformity into the light field.

Alternatively, other reflector shapes may prove advantageous in use, such as curved reflectors or parabolic reflectors, such that a non-uniform light pattern may be desirable in certain applications. For example, it may be advantageous to model a certain light distribution having a degree of non-uniformity and test the response of the solar panel. As such, the planar mirror 302 may be embodied as a non-planar mirror and the reflected beam of light 306 may be a non-uniformly reflected beam of light.

Additionally, it is important to note that planar mirror 302 directs (or reflects) light that illuminates substantially the entire target plane, e.g. the testing surface of the solar panel or the surface of the solar panel including the photovoltaic cells. Thus, the entire target plane is illuminated by the reflected beam of light 306.

Furthermore, it is important that the intensity of the light field in the spectral region between 400 nm and 1800 nm has been increased without increasing the power setting of the flashlamp 102. This is particularly advantageous because this enables the standard LAPSS to be used without altering the power level or spectral profile of the flashlamp 102, while enhancing the intensity of the light field within the spectral region between 400 nm and 1800 nm by providing a planar mirror 302 to direct a uniformly reflected beam of light 306 back at the target plane.

Other possible solutions to accurately testing these solar cells that require a higher intensity irradiation may include using lenses or other optics to enhance the overall irradiation or the light field; however, since such optics will introduce non-uniformity into the irradiating light field (similar to the use of curved mirrors), such solutions are usually undesirable, although may be advantageous in some applications in which a non-uniform light field is desired.

Thus, using a planar mirror 302 to reflect a secondary beam of light 305, i.e. reflected beam of light 306, provides a very simple and elegant solution to enhancing the intensity of the light field in the region from 400 nm to 1800 nm, which will enable the accurate testing of solar panels used, for example on Venus or Mercury probes, that have single or multi-junction photovoltaic cells requiring a testing illumination field of an intensity greater than 1 AM0.

Figure 4:
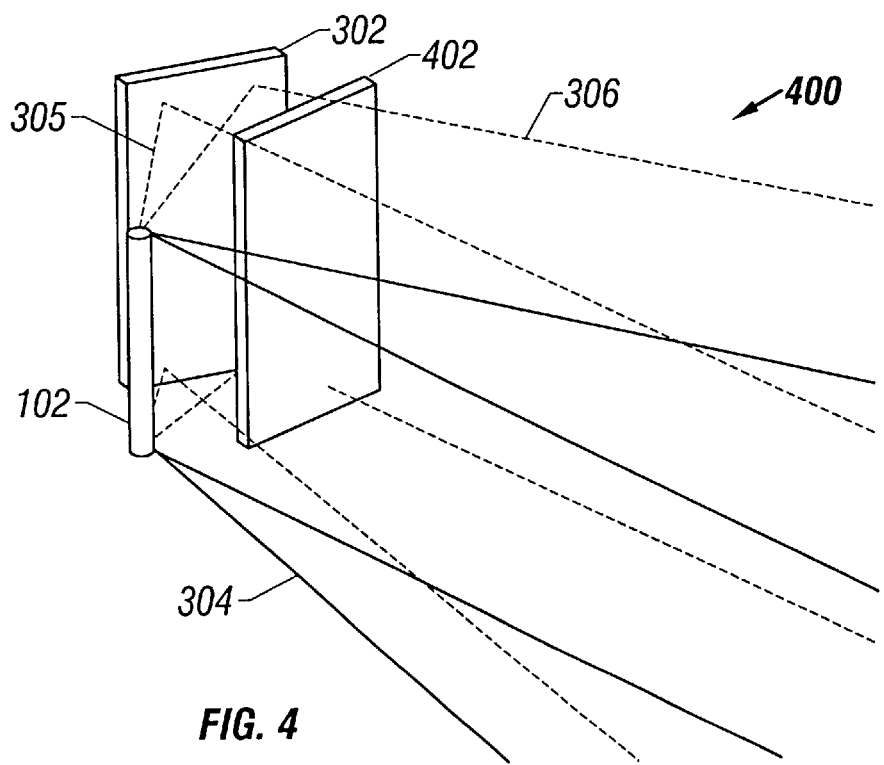
FIG. 4 is a diagram of a variation of the improved Large Area Pulsed Solar Simulator of FIG. 3 employing spectral filters.

Referring next to FIG. 4, a diagram is shown of a variation of the improved Large Area Pulsed Solar Simulator of FIG. 3 employing spectral filters. Shown is another embodiment of an improved LAPSS 400 including the flashlamp 102, primary beam of light 304, planar mirror 302 (or mirror), spectral filter 402, secondary beam of light 305 and reflected beam of light 306. The primary, secondary, and reflected beams of light are similarly defined as above.

This embodiment of the improved LAPSS is configured nearly identically to the embodiment shown in FIG. 3, with the addition of a spectral filter 402 positioned in between the planar mirror 302 and the target plane (not shown), i.e. the multi-junction photovoltaic solar panel. The spectral filter 402 is typically mounted or held in position such that the reflected beam of light 306 (secondary beam of light 305) passes directly through and is filtered by the spectral filter 402 on its path toward the target plane, but the primary beam of light 304 (or beam of light 304) does not pass through the spectral filter 402 on its path toward the target plane. Thus, typically the spectral filter 402 is mounted within the lamp housing (not shown) in front of the planar mirror 302, but not in front of the primary beam of light 304. The spectral filter 402 may be mounted within the lamp housing by using standard mounting brackets or mounting plates as known in the art. As will be described below, the spectral filter 402 may be positioned in between the flashlamp 102 and the planar mirror 302, such that the secondary beam of light 305 is filtered prior to being reflected, or directed toward the target plane.

In operation, the spectral filter 402 allows the passage of light having a desired range of wavelengths and blocks light having wavelengths outside of the desired range of wavelengths. In this embodiment, the spectral filter 402 is a long pass filter as known in the art. Advantageously, in this embodiment, the spectral filter 402 allows light having wavelengths greater than 1000 nm to pass, i.e. light in the long IR region, while blocking light having wavelengths less than 1000 nm. Thus, the sum of the primary beam of light 304 and the reflected beam of light 306, which includes light in the spectral region greater than 1000 nm, advantageously provides a total light field that has essentially twice the spectral intensity of light in the spectral region between 1000 nm and 1800 nm as compared to the conventional LAPSS, while advantageously maintaining the same spectral intensity as the conventional LAPSS in the spectral region from 400 nm to 1000 nm. Thus, accurate testing of multi-junction hotovoltaic panels is possible because the total light field, i.e. the sum of the primary beam of light 304 and the reflected beam of light 306, is enhanced with light in the long IR region, i.e. between 1000 nm and 1800 nm.

In contrast to the embodiment of FIG. 3, the embodiment of FIG. 4 increases or enhances the intensity of the total light field only in the desired range of wavelengths, instead of across the entire spectrum from 400 nm to 1800 nm. The term enhanced as used throughout the specification generally means increased or strengthened, as in an enhanced illumination, enhanced intensity, or an enhanced light field. Thus, the device of FIG. 3 may be used to test solar cells requiring enhanced intensity illumination across the entire spectrum, but the device of FIG. 4 should not accurately test such solar cells because the intensity of the total light field is not enhanced between 400 nm and 1000 nm.

Furthermore, advantageously, the testing of multi-junction cells that require a testing illumination light field of approximately 1 AM0 from 400 nm up to 1800 nm is enabled. The embodiment of FIG. 4, increases the intensity of the total light field in the second spectral region 204 of FIG. 2 while not altering the intensity of the total light field in the first spectral region 202 of FIG. 2. Thus, in contrast to the conventional LAPSS of FIG. 1, the total light field produced by the improved LAPSS of FIG. 4 is enhanced in the long IR region; thus, more accurately simulating actual sunlight at 1 AM0.

Again, similar to the embodiment shown in FIG. 3, the embodiment in FIG. 4 accomplishes this enhanced irradiation without increasing the power of the flashlamp 102 or increasing the number of flashlamps 102. Furthermore, a planar mirror 302 is used, which again causes the reflected beam of light 306 to be very uniform. Thus, the sum of the primary beam of light 304 and the reflected beam of light 306 is essentially uniform, i.e. within ±2% uniformity. Additionally, since the distance from the flashlamp 102 is great, e.g. about 40 feet, the entire testing surface (at the target plane) of the solar panel is irradiated uniformly by both the primary beam of light 304 and the reflected beam of light 306.

Again, as stated above, other embodiments of the improved LAPSS of FIG. 4 (and also the improved LAPSS as described further in FIGS. 5, 6 and 7) may use a non-planar mirror, as it may prove advantageous or desirable to model a total light field having a certain degree of non-uniformity. As such, the planar mirror 302 may be a curved or parabolic. mirror and the reflected beam of light 306 may thus be a non-uniformly reflected.

Furthermore, the embodiment shown in FIG. 4 also produces a total light field that has the same spectral intensity in the spectral region between 400 nm and 1000 nm as the conventional LAPSS of FIG. 1, whereas the embodiment shown in FIG. 3 essentially has doubled intensity in this spectral region between 400 nm and 1000 nm. Thus, advantageously, the entire solar spectrum from 400 nm to 1800 nm is more accurately simulated in the improved LAPSS of FIG. 4 since the conventional LAPSS already accurately simulates the solar spectrum between 400 nm and 1000 nm without additional enhancement and the spectral region between 1000 nm and 1800 nm has been sufficiently enhanced to overcome the deficiencies of the conventional LAPSS.

Figure 5:
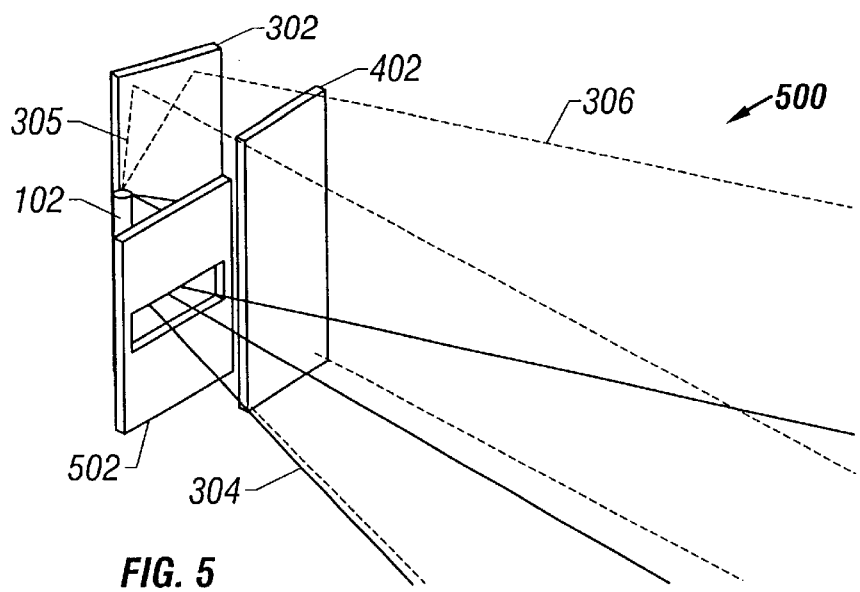
FIG. 5 is a diagram of yet a variation of the improved Large Area Pulsed Solar Simulator of FIG. 4 employing spectral filters and baffles.

Referring next to FIG. 5, a diagram is shown of a variation of the improved Large Area Pulsed Solar Simulator of FIG. 4 employing spectral filters and baffles. Shown is a variation of an improved LAPSS 500 including the flashlamp 102, primary beam of light 304, planar mirror 302, spectral filter 402, secondary beam of light 305, reflected beam of light 306, and a slit baffle 502.

This embodiment of the present invention is configured as the embodiment shown in FIG. 4 and again is used in the accurate testing of multi-junction solar cells responsive to light from 400 nm to 1800 nm; however, a slit baffle 502 is positioned in between the flashlamp 102 and the target plane (not shown) such that the primary beam of light 304 passes therethrough, but the secondary beam of light 305 and the reflected beam of light 306 do not pass therethrough. The slit baffle 502 is typically fixed within the lamp housing (not shown) such that the slit baffle 502 is positioned in front of the flashlamp 102 but not blocking the reflected beam of light 306. The slit baffle 502 may be held in position in front of the flashlamp 102 using standard mounting brackets or supports. Thus, the flashlamp 102, the slit baffle 502, the planar mirror 302, and the spectral filter 402 are all viewable through the aperture (not shown) of the lamp housing from the target plane.

The slit baffle 502 is used to limit the effective length of the flashlamp 102 and lower the irradiation level of the primary beam of light 304. Thus, this embodiment is primarily used for small area solar panel testing. For example, the overall power of the total light field, i.e. the combined primary beam of light 304 and the reflected beam of light 306, is about one-third of that of the standard LAPSS enabling the testing of solar panels having an area about half of that of the standard large area, e.g. 2' to 4' square. The size of the slit baffle 502 and the specific amount of, the irradiation that is limited is optimized in order to balance the spectral intensity of the irradiation of the target plane over the entire spectrum of 400 nm to 1800 nm. Such slit baffles 502 are well known in the art and readily available. Advantageously, the improved LAPSS can be readily adjustable to accurately test differently sized photovoltaic solar panels, and in particular, multi-junction photovoltaic panels that are more sensitive to the light having a wavelength between 1000 nm and 1800 nm. Alternatively, other baffles, (without slits) as known in the art, may be used to limit the intensity of the primary beam of light 304.

Figure 6:
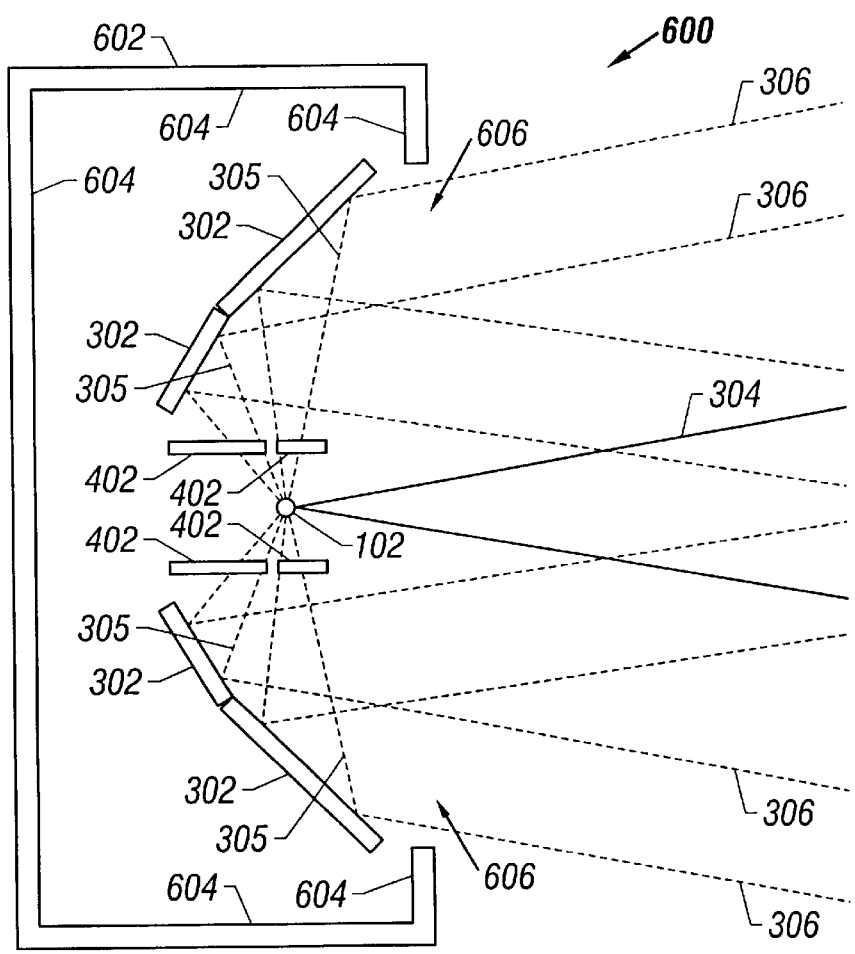
FIG. 6 is a diagram of an improved Large Area Pulsed Solar Simulator employing multiple sets of planar mirrors and spectral filters in accordance with another variation of FIG. 4.

Referring next to FIG. 6, a diagram is shown of an improved Large Area Pulsed Solar Simulator (LAPSS) employing multiple sets of planar mirrors and spectral filters in accordance with another variation of the embodiment of FIG. 4. Shown is another embodiment of an improved LAPSS 600 including the flashlamp 102, primary beam of light 304, planar mirrors 302, spectral filters 402, secondary beams of light 305, reflected beams of light 306, lamp housing 602, non-reflective inner walls 604, and the aperture 606.

This embodiment of the present invention is configured similarly to that of FIG. 4; however, four planar mirrors 302 are positioned to uniformly reflect four reflected beams of light 306. Thus, four planar mirrors 302 are fixed behind and to the side of the flashlamp 102 or at the side of the flashlamp 102 within the lamp housing 602. For example, one each side of the flashlamp 102, one planar mirror 302 may be positioned at an angle behind and to the side of the flashlamp 102, while another planar mirror 302 may be positioned at another angle directly to the side of the flashlamp 102. Thus, the four planar mirrors 302 are located adjacent to the flashlamp 102 or "flank" the flashlamp 102 and are oriented such that the secondary beams of light 305 are directed back towards the target plane (not shown) as reflected beams of light 306. Note that the planar mirrors 302 may be rotatably attached within the lamp housing 602 such that they may be precisely positioned depending on the size of the target plane and the distance from the target plane. Furthermore, spectral filters 402 are shown as positioned between the flashlamp 102 and each of planar mirrors 302, i.e. within the path of the secondary beams of light 305 to the target plane. Note that the spectral filters 402 are shown as four separate spectral filters 402, but may be configured as one spectral filter on each side of the flashlamp 102. The four planar mirrors 302 and the spectral filters may be mounted within the lamp housing with mounting brackets or plates. Again, the flashlamp 102, the four planar mirrors 302, and the four spectral filters 402 all are located within the lamp housing 602 and are all viewable through the aperture 606 of the lamp housing 602 from the target plane. The lamp housing 602 contains non-reflective inner walls 604 to prevent non-uniformly reflected light from irradiating the target plane.

In operation, this embodiment of the improved LAPSS 600 provides a greater spectral enhancement than the embodiments of FIGS. 3 through 5, since multiple separate secondary beams of light 305 are filtered and directed (reflected) back toward the target plane as reflected beams of light 306, in addition to the primary beam of light 304 that is directly projected toward the target plane (as in the standard LAPSS). This embodiment enables spectral balance across the entire range from 400 nm to 1800 nm while using the full available lamp power. All of the secondary beams of light 306 are advantageously uniformly reflected so that no non-uniformity is introduced into the total light field (e.g. the uniformity of the total light field is within ±2%).

Additionally, a single type of long pass spectral filter (also referred to as an IR filter) may be used having a cutoff of 1000 nm, for example. Thus, the secondary beams of light 305 having been filtered and reflected beams of light 306 will only contain light in the long IR spectral region, i.e. wavelengths greater than 1000 nm.

Alternatively, the spectral filters 402 may have different points at which they transmit light, allowing for the fine tuning of the spectral match. Thus, for a certain power level, the total light field may be configured to most closely simulate natural sunlight at 1 AM0. For example, there may be two spectral filters on each side of the flashlamp 102, a first long pass spectral filter at 1000 nm and a second long pass spectral filter at 1500 nm. Thus, for example, the total additive light field (i.e. the sum of the primary beam of light 304 and all of the respective reflected beams of light 306) might have the standard intensity known in the standard LAPSS between 400 nm and 1000 nm, a double spectral intensity level between 1000 nm and 1500 nm, and a quadruple spectral intensity between 1500 nm and 1800 nm.

Thus, advantageously, depending on the specific choice of spectral filters and their respective cutoff points, the spectral balance of the total light field may be controlled.

Additionally, slit baffles may be positioned between one or more of the planar mirrors 302 and the target plane, so as to further fine tune the spectral balance of the total light field.

It is important to note that due to the distance from the flashlamp 102 to the target plane, e.g. about 40 feet, the primary beam of light 304 and each of the reflected beams of light 306 fully irradiate the entire surface of the target plane with uniform light. This is achieved without altering the original distance of the standard LAPSS from the target plane and without increasing the number of flashlamps 102 used. Furthermore, the spectral filters 402 may be positioned between the planar mirrors 302 and the target in other embodiments.

Figure 7:
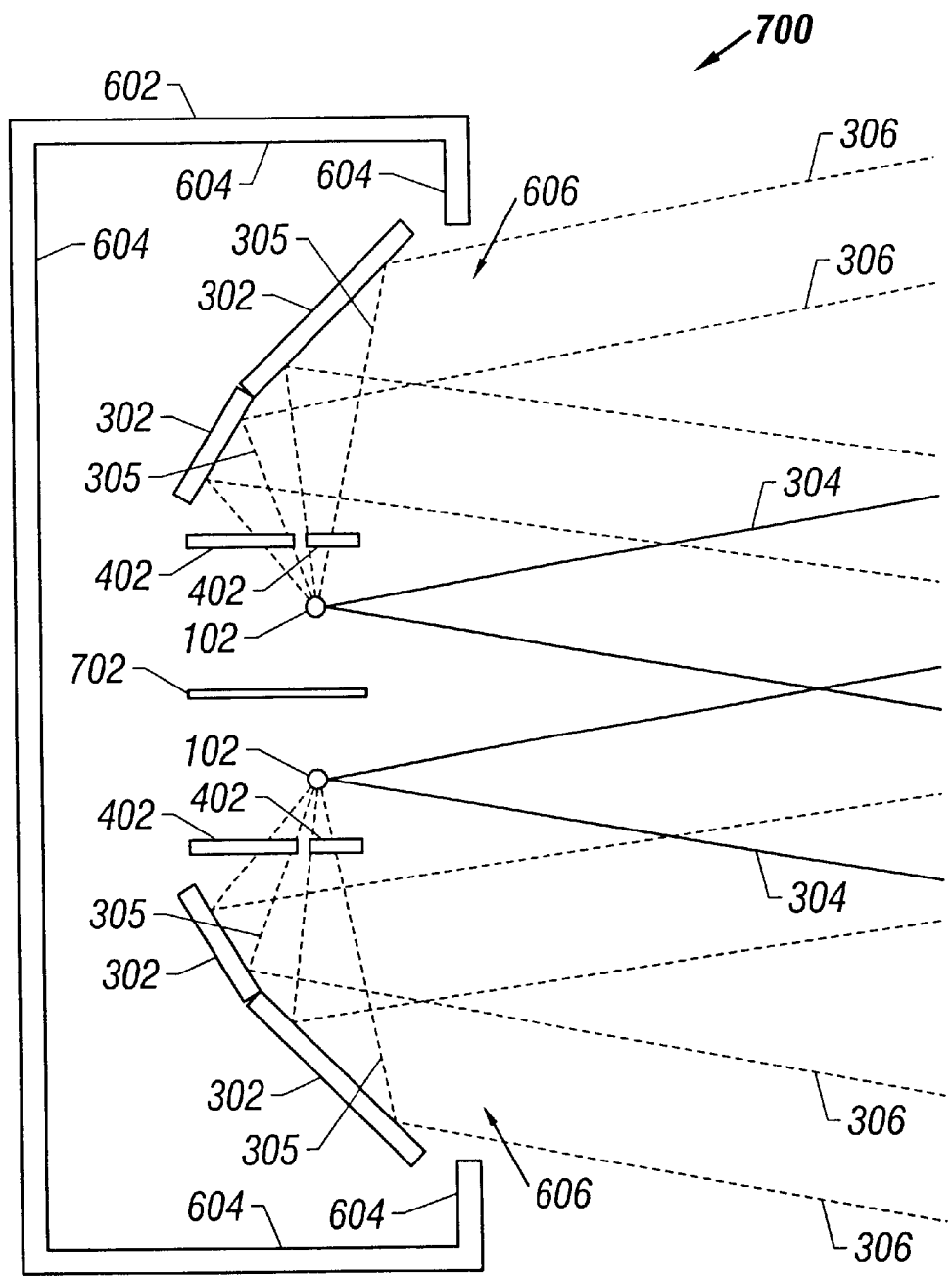
FIG. 7 is a diagram of an improved Large Area Pulsed Solar Simulator employing multiple flashlamps each with planar mirrors and spectral filters in accordance with a variation of the embodiment of FIG. 6.

Referring next to FIG. 7, a diagram is shown of an improved Large Area Pulsed Solar Simulator employing multiple flashlamps each with planar mirrors and spectral filters in accordance with a variation of the embodiment of FIG. 6. Shown is another embodiment of an improved LAPSS 700 including two flashlamps 102, two primary beams of light 304 from a respective one of the two flashlamps 102, planar mirrors 302, spectral filters 402, baffle 702, secondary beams of light 305, reflected beams of light 306, lamp housing 602, non-reflective inner walls 604, and the aperture 606.

This embodiment of the present invention is configured similarly to that of FIG. 6; however, instead of one flashlamp 102, two flashlamps 102 are employed. Each flashlamp 102 produces a primary beam of light 304 and is flanked by two planar mirrors 302, each oriented to uniformly reflect respective secondary beams of light 305 as respective reflected beams of light 306 toward the target plane (not shown). Thus, the four planar mirrors 302 are fixed behind and to the side of the flashlamps 102 or to the side of the flashlamps 102 within the lamp housing 602, i.e. the planar mirrors 302 are located adjacent or flank the respective flashlamps 102. Note again that the planar mirrors 302 may be rotatably attached within the lamp housing 602 such that they may be precisely positioned depending on the size of the target plane and the distance from the target plane. A baffle 702 is positioned in between the two flashlamps 102 to prevent light emitted from one flashlamp to be added to light emitted from the other flashlamp and reflected by the planar mirrors aligned with the other flashlamp. Furthermore, spectral filters 402 are shown as positioned between each flashlamp 102 and each respective planar mirror 302. Note again that the spectral filters 402 are shown as four separate spectral filters 402, but may be configured as one spectral filter 402 at the side of each flashlamp 102. Furthermore, all of the components within the lamp housing 602 may be mounted therein with mounting brackets or mounting plates, for example. Again, the two flashlamps 102, the four planar mirrors 302, and the four spectral filters 402 all are located within the lamp housing 602 and are all viewable through the aperture 606 of the lamp housing 602 from the target plane. The lamp housing 602 contains non-reflective inner walls 604 to prevent non-uniformly reflected light from irradiating the target plane.

In operation, this embodiment of the improved LAPSS 700 that uses two flashlamps 102 (e.g. two Xenon flashlamps) provides an enhanced IR spectral intensity compared to dual flashlamp conventional LAPSS. Thus, with the use of planar mirrors 302 and spectral filters 402, the total light field emitted at the target plane is enhanced in the spectral region between 1000 nm and 1800 nm, which enables accurate solar simulation of 1 AM0 for accurately testing multi-junction photovoltaic solar panels.

Figure 8:
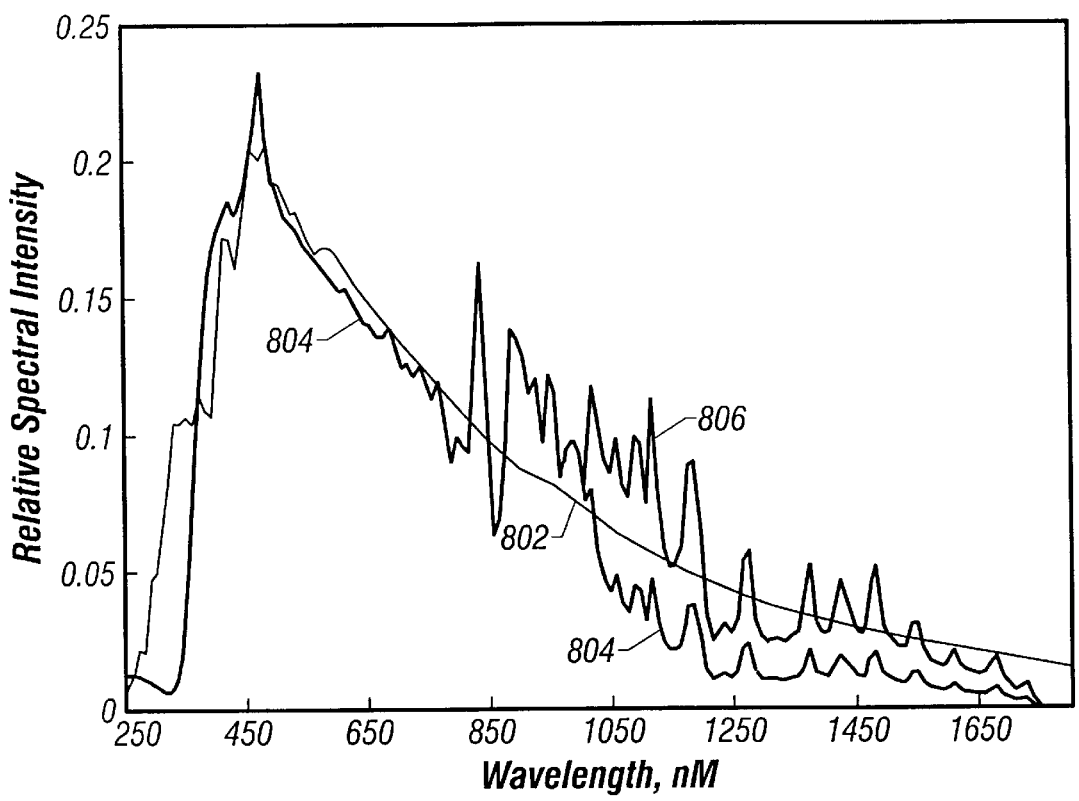
FIG. 8 is a graph of the relative spectral intensity vs. wavelength for the spectral region of the prior art LAPSS of FIG. 1 compared to that of the sunlight at one AM0 and further compared to a theoretical relative spectral intensity vs wavelength of an improved Large Area Pulsed Solar Simulator using planar mirrors and spectral filters in accordance with the embodiments of FIGS. 4–7.

Referring next to FIG. 8, a graph is shown of the relative spectral intensity vs. wavelength for the spectral region of the prior art LAPSS of FIG. 1 compared to that of the sun at air mass zero (AM0) and further compared to the theoretical relative spectral intensity vs. wavelength of an improved LAPSS using planar mirrors and spectral filters in accordance with the embodiments of the present invention as shown in FIGS. 4–7. Shown are the relative spectral intensity (in units of watts/cm$^2$/micron) of the sun at 1 AM0 802, the standard LAPSS 804, and the theoretical IR enhanced LAPSS 806 over wavelength in units of nanometers.

As illustrated, and as expected, the spectral intensity of the standard LAPSS 804 and the enhanced LAPSS 806 are identical up until about 1000 nm. Thus, accurate testing can be conventionally done to the solar panels using single junction and dual-junction photovoltaic cells that are responsive to light having wavelengths between approximately 400 nm and 850 nm, as described above. Again, as earlier described and illustrated, the spectral intensity of the standard LAPSS 804 does not adequately simulate natural sunlight at wavelengths greater than 1000 nm, which is required to test multi-junction photovoltaic solar cells. The total integrated energy of the wavelengths between 1000 nm and 1800 nm is about one third that of sunlight at 1 AM0.

Advantageously, the spectral intensity of the enhanced LAPSS 806 provides an enhanced light field in the spectral region greater than 1000 nm; and thus, more closely simulates sunlight at 1 AM0 802. Again, the spectral intensity does not have to match exactly (e.g. point to point) that of sunlight, but the total integrated energy of the enhanced LAPSS for the spectral band (i.e. 1000 nm to 1800 nm) should match the total integrated energy of sunlight at 1 AM0 for the same spectral band. In fact, the total integrated energy of the enhanced LAPSS over spectral region of 1000 nm to 1800 nm is slightly greater than that of natural sunlight.

Thus, advantageously, it is possible to accurately simulate natural sunlight across the entire spectral region from 400 nm to 1800 nm and therefore, to accurately test the functionality and reliability of multi-junction photovoltaic cells on solar panels under natural conditions. The solution of using planar mirrors and spectral filters provides a simple and easy method to implement an improvement to the standard LAPSS without adding additional lamps, without introducing non-uniformity into the total light field, without increasing the lamp power and without altering the distance of the flashlamp/s from the target plane.

Figure 9:
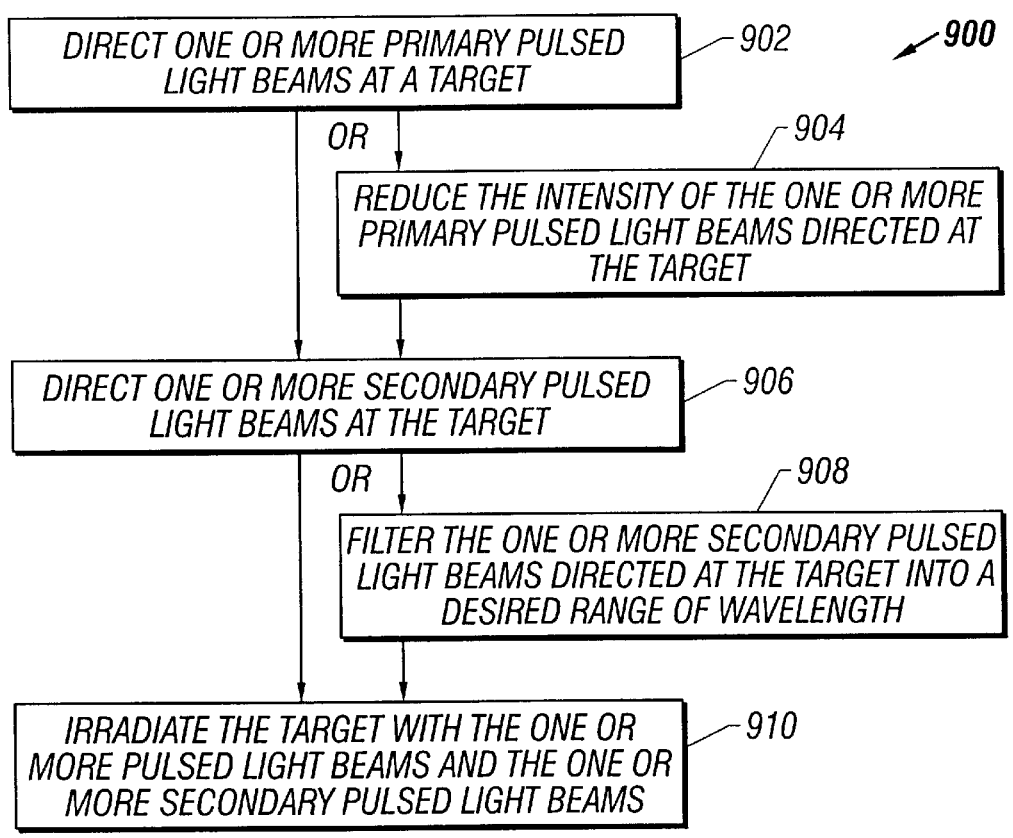
FIG. 9 is flowchart of the steps performed in use of the one or more embodiments and variations thereof as shown in FIGS. 3–7.

Referring finally to FIG. 9, a flowchart is shown of the steps performed in use of the one or more embodiments and variations thereof as shown in FIGS. 3–7. First, an improved LAPSS (as earlier described with reference to FIGS. 3–7) directs one or more primary pulsed light beams at a target (Block 902), for example, using one or more Xenon flashlamps as known in the art. The primary pulsed light beams are the primary beams of light 304 described above and are emitted directly at the target plane (e.g. testing surface of the solar panel) through the aperture of the lamp housing, as is known to the conventional LAPSS.

Next, in the embodiments of FIGS. 3–7, one or more secondary pulsed light beams are directed toward the target plane (Block 906), for example, using planar mirrors as described above. The secondary pulsed light beams are the "secondary beams of light 305" earlier described that are initially emitted from the flashlamp away from the target plane. This is a departure from the prior art LAPSS, where only primary pulsed light beams are commonly directed at the target plane as in Block 902, not secondary pulsed light beams. These secondary pulsed light beams are reflected pulsed light beams (i.e. reflected beams of light 306) once directed toward the target plane. Furthermore, advantageously, the secondary pulsed light beams may be uniformly directed toward the target plane, e.g. uniformly reflected by planar mirrors as uniformly reflected beams of light. The various embodiments of the present invention advantageously direct the secondary pulse light beams at the target plane for the purpose of enhancing the spectral intensity of the light field irradiating the target plane in the spectral region from 400 nm to 1800 nm (to test solar cells requiring a light field greater than 1 AM0), and more particularly enhancing the spectral intensity in the region from 1000 nm to 1800 nm (to test multi-junction solar cells at 1 AM0 from 400 nm to 1800 nm). Alternatively, as is done for example in the embodiment of FIG. 5, prior to performing the step of Block 906, the intensity of the one or more primary pulsed light beams directed at the target plane may be reduced (Block 904), for example, through the use of a slit baffle as described with reference to FIG. 5. Thus, for smaller area solar panels, the step of Block 904 may be performed. Also note that in embodiments in which it is advantageous to produce a light field having a desired level of non-uniformity, non-planar mirrors are used to direct non-uniformly reflected pulsed light beams at the target plane.

Next, the target is irradiated with the sum of the one or more primary pulsed light beams, e.g. one or more primary beams of light 304, and the one or more secondary pulsed light beams having been directed at the target plane, e.g. one or more reflected beams of light 306, (Block 910) for an enhancement of the intensity of the light field that irradiates the target. Note that these steps, shown in Blocks 902, 906 and 910 are sufficient to enable the testing of the solar cells, for example on Venus or Mercury probes that require a higher than normal intensity light field.

Furthermore, for accurate testing of multi-junction photovoltaic cells that are responsive to light from 400 nm to 1800 nm, i.e. in the embodiments of FIGS. 4–7, prior to the step in Block 910, the one or more secondary pulsed light beams may be filtered in a desired range of wavelengths or desired wavelength spectrum (Block 908) through the use of spectral filters. Although the step in Block 908 is shown as occurring after the directing step of Block 906, this filtering step of Block 908 may occur prior to such directing step of Block 906. This will provide a total light field directed at the target plane that is enhanced with light being passed through by the spectral filters. For example, in one example of the embodiments of FIGS. 4–7, the one or more secondary pulsed light beams (or directed or reflected pulsed light beams) may be filtered with long pass spectral filters that pass light having a wavelength greater than 1000 nm. Thus, advantageously, at the step of Block 910, the light field that irradiates the target (e.g. a multi-junction photovoltaic panel) is long IR enhanced, i.e. is enhanced with a higher intensity of light having wavelengths between 1000 nm and 1800 nm as shown as the relative spectral intensity vs. wavelength of the enhanced LAPSS 806 of FIG. 8. Thus, solar panels using multi-junction photovoltaic cells that are more sensitive to this range of wavelengths may be accurately tested prior to deployment into space, whereas the conventional LAPSS does not provide the required intensity of light in the spectral region from 1000 nm to 1800 nm to adequately test such multi-junction photovoltaic cells.

While the invention herein disclosed has been described by means of specific embodiments and applications thereof, numerous modifications and variations could be made thereto by those skilled in the art without departing from the scope of the invention set forth in the claims.

What is claimed is:

1. A pulsed solar simulator comprising:
   one or more mirrors;
   a flashlamp adjacent to the one or more mirrors for producing pulsed light beams comprising wavelengths from 400 nm to 1800 nm, wherein one or more primary pulsed light beams are directed at substantially an entire testing surface of a target and each of one or more secondary pulsed light beams are directed at respective ones of one or more mirrors and are each directed toward substantially the entire testing surface of the target as one or more reflected pulsed light beams by the respective ones of the one or more mirrors;
   wherein the one or more reflected pulsed light beams provide enhanced irradiation at substantially the entire testing surface of the target compared to the irradiation provided by the one or more primary pulsed light beams alone.

2. The pulsed solar simulator of claim 1 further comprising another flashlamp for producing additional pulsed light beams, wherein one or more additional primary pulsed light beams are directed at the target.

3. The pulsed solar simulator of claim 2 further comprising one or more additional mirrors located adjacent to the other flashlamp, wherein one or more additional secondary pulsed light beams directed from said other flashlamp to respective ones of the one or more additional mirrors are directed as one or more additional reflected pulsed light beams toward said target by the one or more additional mirrors.

4. The pulsed solar simulator of claim 3 further comprising one or more additional respective spectral filters positioned such that said one or more additional reflected pulsed light beams comprise light having an additional desired wavelength spectrum directed at the target, wherein said one or more additional reflected pulsed light beams provide enhanced irradiation in the additional desired wavelength spectrum at said target.

5. The pulsed solar simulator of claim 1 wherein said one or more mirrors comprise one or more planar mirrors directing one or more uniformly reflected pulsed light beams toward said target.

6. The pulsed solar simulator of claim 1 further comprising one or more respective spectral filters positioned such that said one or more reflected pulsed light beams comprise light having a desired wavelength spectrum, wherein said one or more reflected pulsed light beams provide enhanced irradiation in the desired wavelength spectrum at substantially said entire testing surface of said target compared to the irradiation provided by said one or more primary pulsed light beams alone.

7. The pulsed solar simulator of claim 6 wherein said one or more respective spectral filters comprise long pass spectral filters that pass light having a wavelength greater than 1000 nm, wherein said one or more reflected pulsed light beams provide enhanced irradiation greater than 1000 nm at substantially said entire testing surface of said target compared to the irradiation provided by said one or more primary pulsed light beams alone.

8. The pulsed solar simulator of claim 6 further comprising a baffle positioned in between said flashlamp and said target such that the baffle reduces the intensity of said one or more primary pulsed light beams directed toward said target.

9. The pulsed solar simulator of claim 6 wherein substantially said entire testing surface of said target is irradiated with an irradiance having a spectral intensity simulating sun light at approximately one AM0 in the spectral region from 400 nm to 1800 nm.

10. The pulsed solar simulator of claim 1 further comprising a solar panel located a distance from said flashlamp, wherein said solar panel comprises said target and includes said testing surface.

11. A method of solar simulation for testing photovoltaic solar cells comprising:
    producing one or more primary pulsed light beams having wavelengths comprising 400 nm to 1800 nm emitted toward a target and one or more secondary pulsed light beams having the wavelengths comprising 400 nm to 1800 nm emitted away from the target;
    directing the one or more primary pulsed light beams toward substantially an entire testing surface of a target;
    directing each of the one or more secondary pulsed light beams toward substantially the entire testing surface of the target; and
    irradiating substantially the entire surface of the target with the one or more primary pulsed light beams and the one or more secondary pulsed light beams, wherein the one or more secondary pulsed light beams provide enhanced irradiation at substantially the entire testing surface of the target compared to the Irradiation provided by the one or more primary pulsed light beams alone.

12. The method of claim 11 wherein the target comprises a solar panel located a distance from said flashlamp, wherein said solar panel includes the testing surface.

13. The method of claim 11 further comprising reducing the intensity of said one or more primary pulsed light beams.

14. The method of claim 11 wherein said irradiating substantially the entire testing surface of target comprises irradiating substantially the entire testing surface of said target, wherein said one or more primary pulsed light beams and said one or more secondary pulsed light beams have a spatial uniformity of less than or equal to ±2%.

15. The method of claim 11 further comprising filtering said one or more secondary pulsed light beams into a desired range of wavelengths, wherein said one or more secondary pulsed light beams provide enhanced irradiation in the desired range of wavelengths at substantially said entire testing surface of said target.

16. The method of claim 15 wherein said filtering comprises filtering said one or more secondary pulsed light beams into wavelengths greater than 1000 nm.

17. The method of claim 16 wherein said irradiating provides an irradiance having a spectral intensity simulating sun light at approximately one AM0 at wavelengths from 400 nm to 1800 nm.

18. The method of claim 11 wherein said directing comprises uniformly directing the one or more secondary pulsed light beams toward substantially the entire testing surface of the target.

* * * * *